(12) United States Patent
Hamada

(10) Patent No.: US 12,337,764 B2
(45) Date of Patent: Jun. 24, 2025

(54) VEHICLE MONITOR APPARATUS

(71) Applicant: Honda Access Corp., Saitama (JP)

(72) Inventor: Hiroshi Hamada, Niiza (JP)

(73) Assignee: Honda Access Corp., Saitama (JP)

( * ) Notice: Subject to any disclaimer, the term of this patent is extended or adjusted under 35 U.S.C. 154(b) by 129 days.

(21) Appl. No.: 18/202,347

(22) Filed: May 26, 2023

(65) Prior Publication Data

US 2023/0415664 A1    Dec. 28, 2023

(30) Foreign Application Priority Data

Jun. 23, 2022  (JP) ................................ 2022-101315

(51) Int. Cl.
    *B60R 11/02*    (2006.01)
    *B60R 11/00*    (2006.01)

(52) U.S. Cl.
    CPC ... *B60R 11/0235* (2013.01); *B60R 2011/0028* (2013.01); *B60R 2011/0084* (2013.01); *B60R 11/0229* (2013.01)

(58) Field of Classification Search
    CPC . B60R 11/0235; B60R 11/0229; B60R 11/02; B60R 2011/0028; B60R 2011/0084; B60R 13/02; B60R 3/64
    See application file for complete search history.

(56) References Cited

U.S. PATENT DOCUMENTS

| | | | | |
|---|---|---|---|---|
| 6,340,146 | B1 * | 1/2002 | Tzeng | G02F 1/133308 16/270 |
| 7,084,932 | B1 * | 8/2006 | Mathias | B60R 11/0235 348/839 |
| 2007/0157254 | A1 * | 7/2007 | Huang | B60R 11/02 725/75 |

FOREIGN PATENT DOCUMENTS

| | | | | |
|---|---|---|---|---|
| JP | 2007168574 | A | * | 7/2007 |
| JP | 2010089595 | A | * | 4/2010 |
| JP | 2014040185 | A | | 3/2014 |
| JP | 2022090616 | A | | 6/2022 |
| WO | WO-2010064691 | A1 * | 6/2010 | ........... B60Q 3/0203 |
| WO | WO-2011016088 | A1 * | 2/2011 | ......... B60R 11/0235 |

OTHER PUBLICATIONS

Japanese office action; Application 2022-101315; Jul. 25, 2023.

* cited by examiner

*Primary Examiner* — Tan Le
(74) *Attorney, Agent, or Firm* — Duft & Bornsen, PC

(57) ABSTRACT

A vehicle monitor apparatus including a vehicle monitor apparatus, including a main bracket supported by a pair of front and rear frames extending in a left-right direction on a ceiling portion of a vehicle, a monitor attached to the main bracket, and a sub-bracket interposed between the main bracket and a target frame, the target frame being at least one of the pair of front and rear frames. The sub-bracket includes a first fixing portion fixed to the target frame and a second fixing portion fixed to the main bracket, and at least one of the first fixing portion and the second fixing portion includes a height adjustment mechanism configured so that a height of the main bracket relative to the target frame is adjustable.

8 Claims, 12 Drawing Sheets

VEHICLE MONITOR APPARATUS

CROSS-REFERENCE TO RELATED APPLICATION

This application is based upon and claims the benefit of priority from Japanese Patent Application No. 2022-101315 filed on Jun. 23, 2022, the contents of which are incorporated herein by reference.

BACKGROUND OF THE INVENTION

Field of the Invention

This invention relates to a vehicle monitor apparatus mounted on a ceiling surface of a vehicle interior.

Description of the Related Art

As this type of apparatuses, there have been a known apparatus that includes a bracket attached to a ceiling portion in a vehicle interior and a monitor body having a base portion supported by the bracket. Such an apparatus is described, for example, in Japanese Unexamined Patent Publication No. 2022-090616 (JP2022-090616A). In the apparatus described in JP2022-090616A, a front end portion and a rear end portion of the bracket are fastened to a pair of front and rear frames provided in the ceiling portion by bolts, respectively.

However, there are variations in the height of the frame of the ceiling portion, and it may be difficult to accurately form a mounting surface for mounting the bracket. Therefore, as in the apparatus described in JP2022-090616A, when the front end portion and the rear end portion of the bracket are fastened to the pair of front and rear frames by bolts, an adjustment for mounting the bracket is required, and thus it is not possible to easily perform the mounting work.

SUMMARY OF THE INVENTION

An aspect of the present invention is a vehicle monitor apparatus, including a main bracket supported by a pair of front and rear frames extending in a left-right direction on a ceiling portion of a vehicle, a monitor attached to the main bracket, and a sub-bracket interposed between the main bracket and a target frame, the target frame being at least one of the pair of front and rear frames. The sub-bracket includes a first fixing portion fixed to the target frame and a second fixing portion fixed to the main bracket, and at least one of the first fixing portion and the second fixing portion includes a height adjustment mechanism configured so that a height of the main bracket relative to the target frame is adjustable.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 10G. A vehicle monitor apparatus according to an embodiment of the present invention is installed at the central portion in the width direction on a ceiling portion (a ceiling surface) in a vehicle interior and is configured to show various images to the rear seat passengers.

Figure 1:
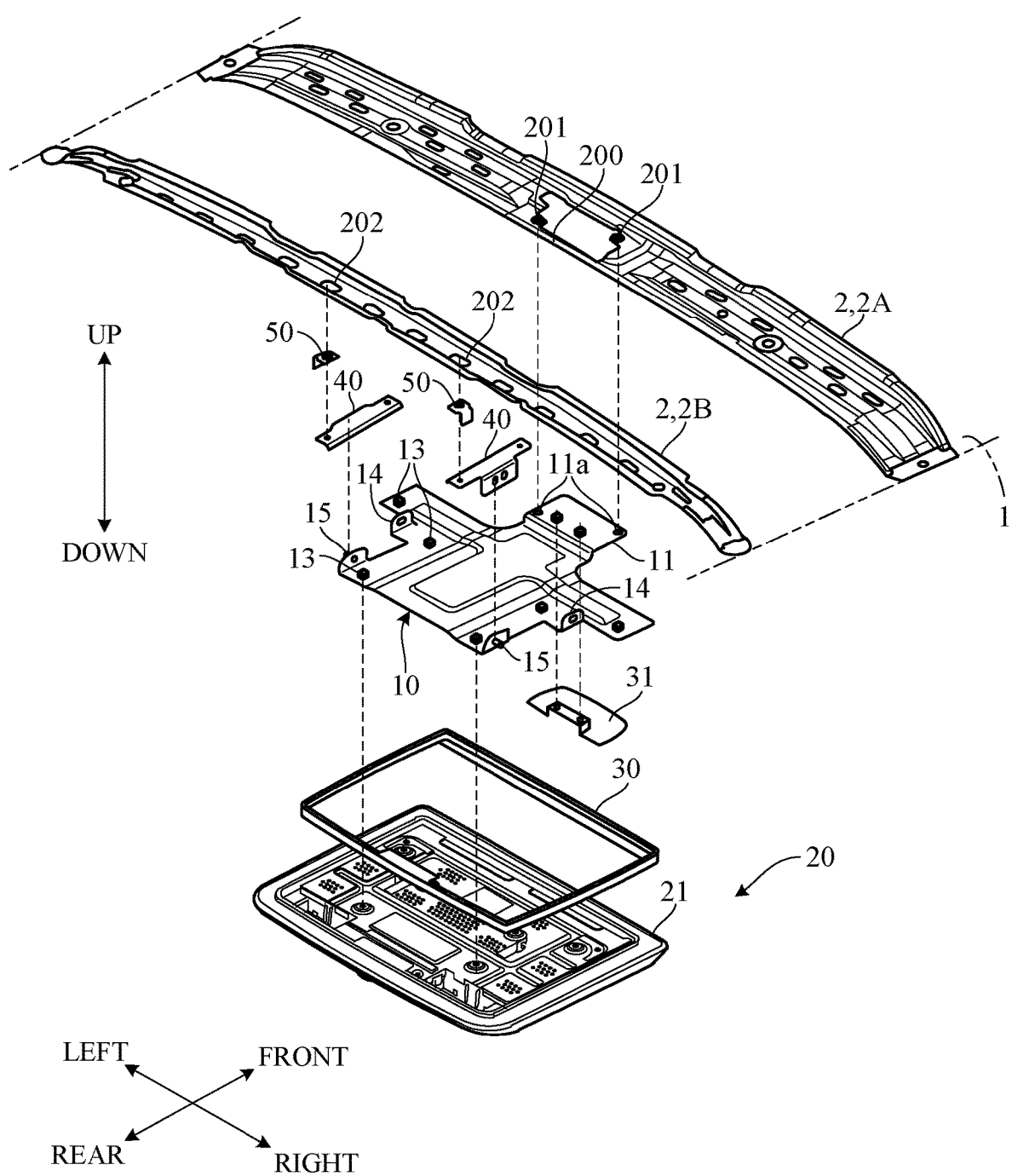
FIG. 1 is an exploded perspective view of a vehicle monitor apparatus according to an embodiment of the present invention.
Figure 2:
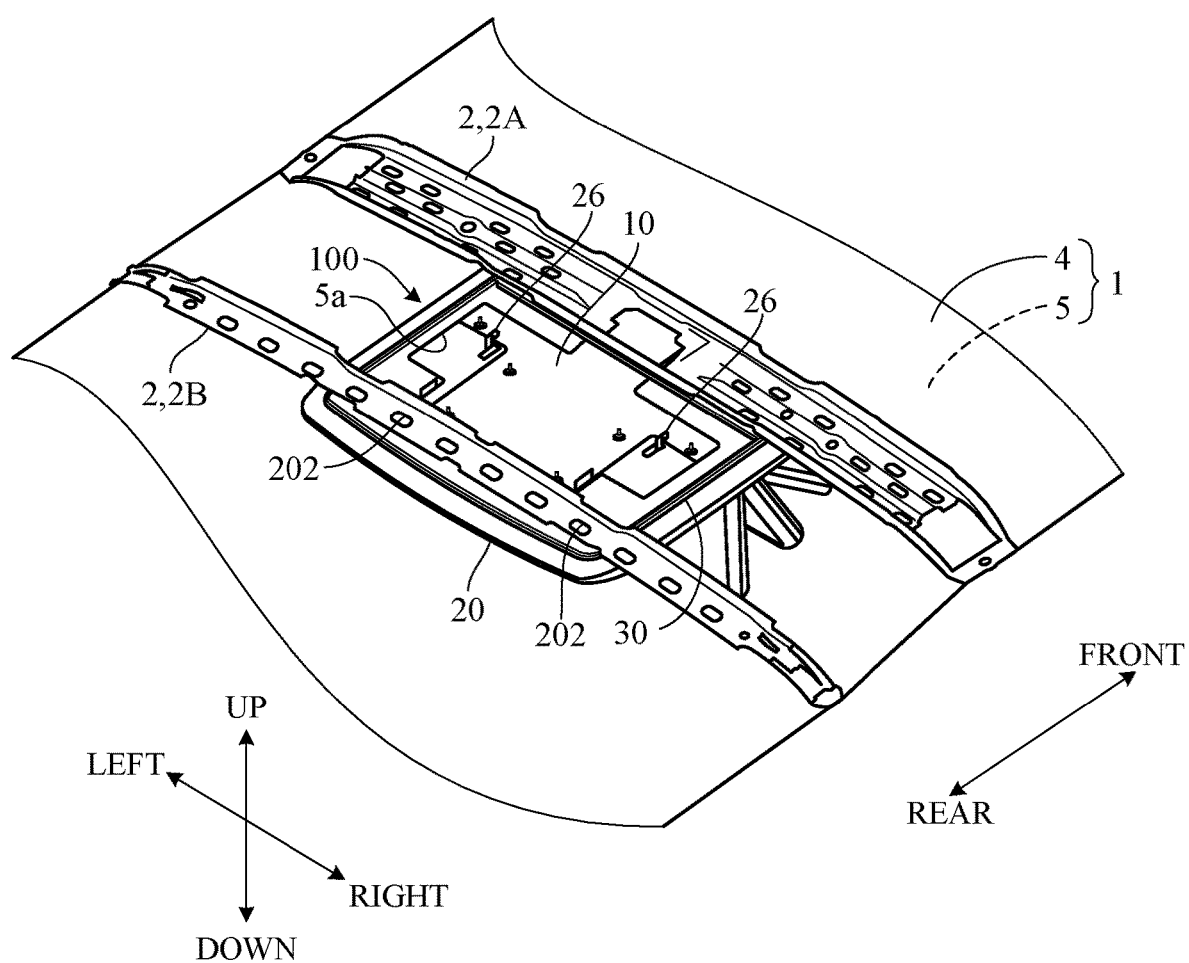
FIG. 2 is a perspective view showing a mounting state of the vehicle monitor apparatus according to the embodiment of the present invention.

FIG. 1 is an exploded perspective view of a vehicle monitor apparatus 100 according to an embodiment of the present invention. FIG. 2 is a perspective view showing the mounting state of the vehicle monitor apparatus 100. For convenience, the front-rear direction (length direction), left-right direction (width direction), and up-down direction (height direction) of the mounted vehicle monitor apparatus 100 are defined as shown in the drawings. The configuration of the components will be described below in accordance with these definitions. FIGS. 1 and 2 are top, rear, and right perspective views of the vehicle monitor apparatus 100.

As shown in FIG. 2, the ceiling portion 1 of a vehicle includes a metallic, thin roof panel 4 that has an approximately rectangular shape in a plan view and extends so as to cover the outer surface of the vehicle and a roof lining 5 that extends under the roof panel 4 and faces the interior of the vehicle opposite to the roof panel 4. The roof lining 5 is an interior material made of a resin or the like, and a hole having a predetermined shape can be easily bored in the roof lining 5 from the inside of the vehicle interior using a tool such as a cutter. A pair of front and rear frames 2 are disposed between the roof panel 4 and roof lining 5 so as to be spaced from each other by a predetermined distance in the front-rear direction and to extend in the left-right direction. In the following description, the frame 2 on the front side may be referred to as the front frame 2A, and the frame 2 on the rear side may be referred to as the rear frame 2B.

The frames 2 are arch-shaped strength members that extend between positions near the upper ends of center pillars (not shown) of the right and left ends of the ceiling portion 1. The frames 2 are disposed integrally with the roof panel 4. Specifically, the frames 2 are bonded to the roof panel 4 using an adhesive such as a mastic sealer. FIGS. 1 and 2 show components such as the frames 2 with the ceiling portion 1 being transparent for convenience.

As shown in FIGS. 1 and 2, the vehicle monitor apparatus 100 includes a main bracket 10 supported by the frames 2 of the ceiling portion 1 of the vehicle, a monitor body 20 mounted on the main bracket 10, a spacer 30 interposed between the ceiling portion 1 (roof lining 5) and a monitor body 20, and sub-brackets 40 interposed between the rear frame 2B and the main bracket 10. As shown in FIG. 2, an opening 5a having approximately the same shape as the external shape of the main bracket 10 is formed in the roof lining 5. The main bracket 10 is mounted on the frames 2 from the vehicle interior side through the opening 5a.

As shown in FIG. 1, an opening 200 having a substantially rectangular shape is formed in the central portion in the left-right direction of the front frame 2A. The front end of main bracket 10 is mounted on the front frame 2A so as to cover the opening 200. The opening 200 may be used to guide a cable, a harness, or the like connected to the monitor body 20 to above the front frame 2A.

The main bracket 10 consists of a metallic plate member that has an approximately tabular shape and extends approximately horizontally. The front end of the bracket 10 is provided with a stay 11. A pair of left and right through holes 11a are formed in the stay 11. By screwing bolts (bolts 201a in FIG. 8) passing through the through holes 11a into screw holes 201 formed around the opening 200 of the front frame 2A, the stay 11 is fixed to the front frame 2A. A cover 31 is installed on the stay 11 from below to cover the entire stay 11.

The main bracket 10 is provided with a plurality of screw holes 13. Specifically, the screw holes 13 are provided at three positions in the front-rear direction at the left end portion and the right end portion of the main bracket 10. Screws passing through the monitor body 20 are screwed into the screw holes 13, whereby the monitor body 20 is fixed to the main bracket 10. At both ends in the left-right direction of the main bracket 10, bent portions 14 bent upward are provided at an intermediate portion in the front-rear direction. At both ends in the left-right direction of the main bracket 10, bent portions 15 bent upward are further provided at the rear end portion. The sub-brackets 40 are attached to the bent portions 15 as described later.

The monitor body 20 includes a base 21 having an approximately rectangular shape in a plan view and a monitor 22 supported by the front end of the base 21 so as to be rotatable in the front-rear direction or the up-down direction using a hinge extending in the left-right direction as a pivot. The base 21 includes a housing formed of a resin material or the like, and various electrical components are arranged inside the housing. The base 21 is formed so as to be wider in the left-right direction than the main bracket 10.

Figure 3:
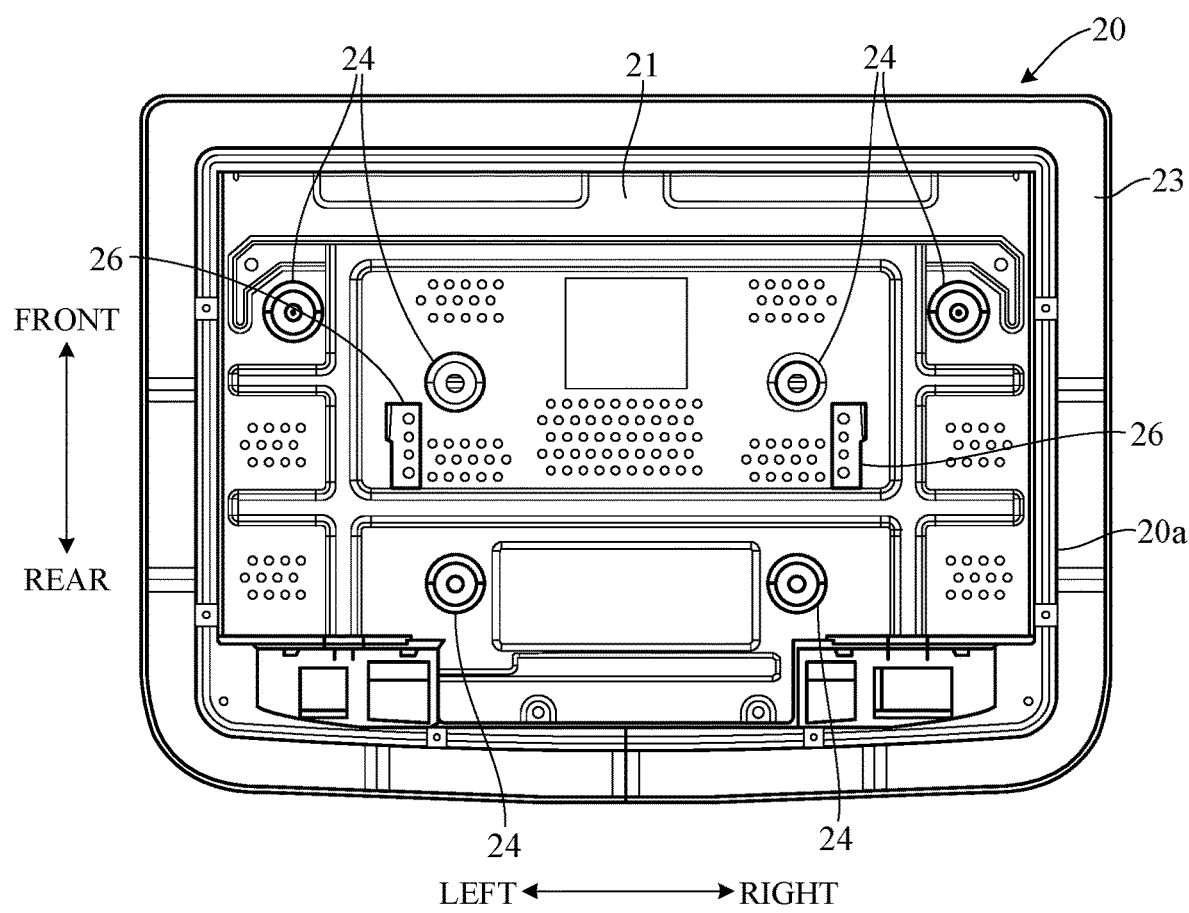
FIG. 3 is a plan view of a monitor body included in the vehicle monitor apparatus according to the embodiment of the present invention.

FIG. 3 is a plan view (top view) showing the external shape of the monitor body 20, in particular, the configuration of the upper surface of the base 21. As shown in FIGS. 1 and 3, a light guide panel 23 that is a part of the base 21 and has a rectangular frame shape is mounted on the periphery of the base 21. A mounting portion 20a of the spacer 30 is disposed along the inner circumferential edge of the light guide panel 23. FIG. 3 shows a state before the spacer 30 is mounted. The spacer 30 has a shorter length (overall length) in the front-rear direction and the left-right direction than the monitor body 20. Therefore, the spacer 30 is mounted on the mounting portion 20a provided on the upper surface of the monitor body 20 without projecting outward from the monitor body 20 in a plan view. Through holes 24 that penetrate the base 21 in the up-down direction corresponding to the screw holes 13 of the main bracket 10 are provided in the base 21. Bolts inserted into the through holes 24 are screwed into the screw holes 13, whereby the monitor body 20 is fixed to the main bracket 10. As shown in FIG. 1, the spacer 30 is formed in a substantially rectangular frame shape. The spacer 30 is made of a rubber material having elasticity or the like.

Figure 4:
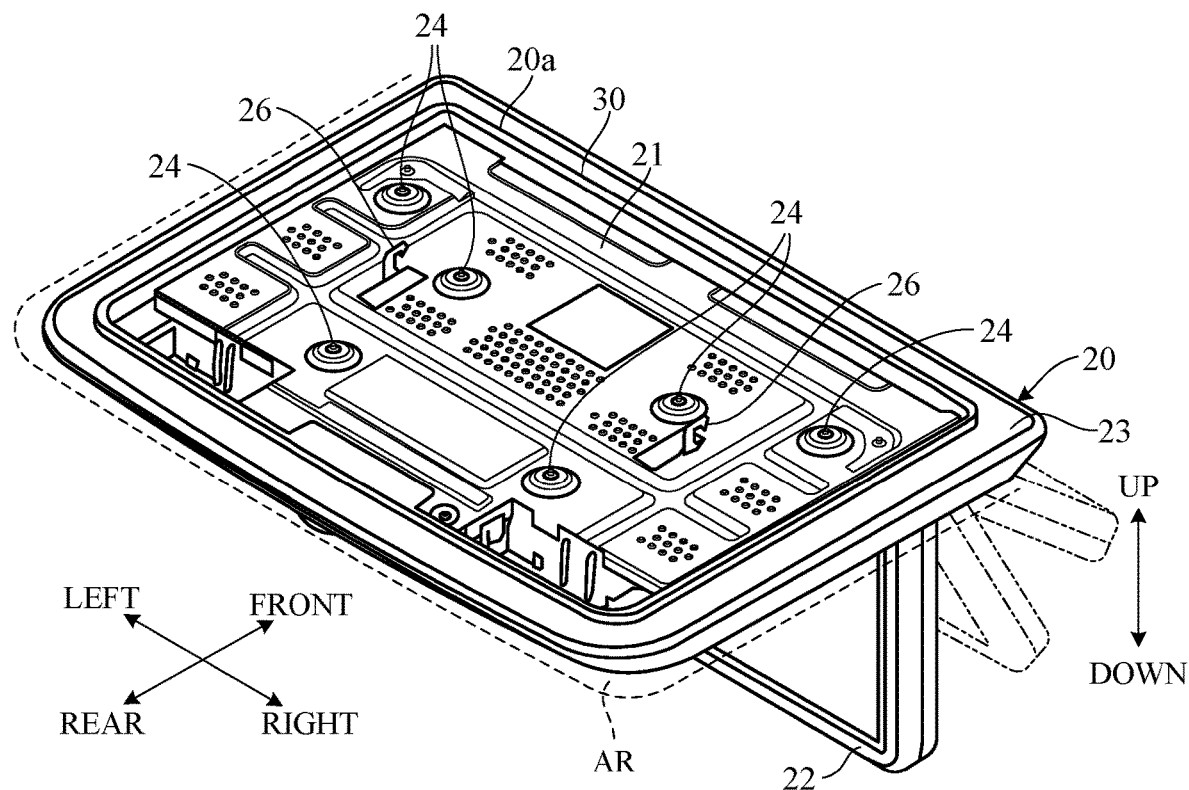
FIG. 4 is a perspective view showing a main configuration of the monitor body included in the vehicle monitor apparatus according to the embodiment of the present invention.

FIG. 4 is a perspective view showing the configuration of major components of the monitor body 20 having the spacer 30 mounted thereon. As shown in FIG. 4, a pair of left and right hooks 26 protruding in a forward-upward direction are fixed to the upper surface of the base 21. The hooks 26 are disposed in positions corresponding to the bent portions 14 (FIG. 1) of the main bracket 10. Thus, after fixing the main bracket 10 to the frames 2 and before fixing the monitor body 20 to the main bracket 10, the hooks 26 are engaged with the bent portions 14 so that the monitor body 20 is hung from the ceiling portion 1. That is, the monitor body 20 is temporarily held. This facilitates the work of mounting the monitor body 20.

The embodiment is characterized by the configuration of the support portion at the rear end portion of the main bracket 10, in which the main bracket 10 is supported on the rear frame 2B through a pair of left and right sub-brackets 40, as shown in FIG. 1. This point will be described below. The sub-brackets 40 are fixed to the rear frame 2B via fastening brackets 50. The fastening brackets 50 are disposed in two slot holes 202 among the plurality of slot holes 202 in the left-right direction provided in the rear frame 2B.

Figure 5A:
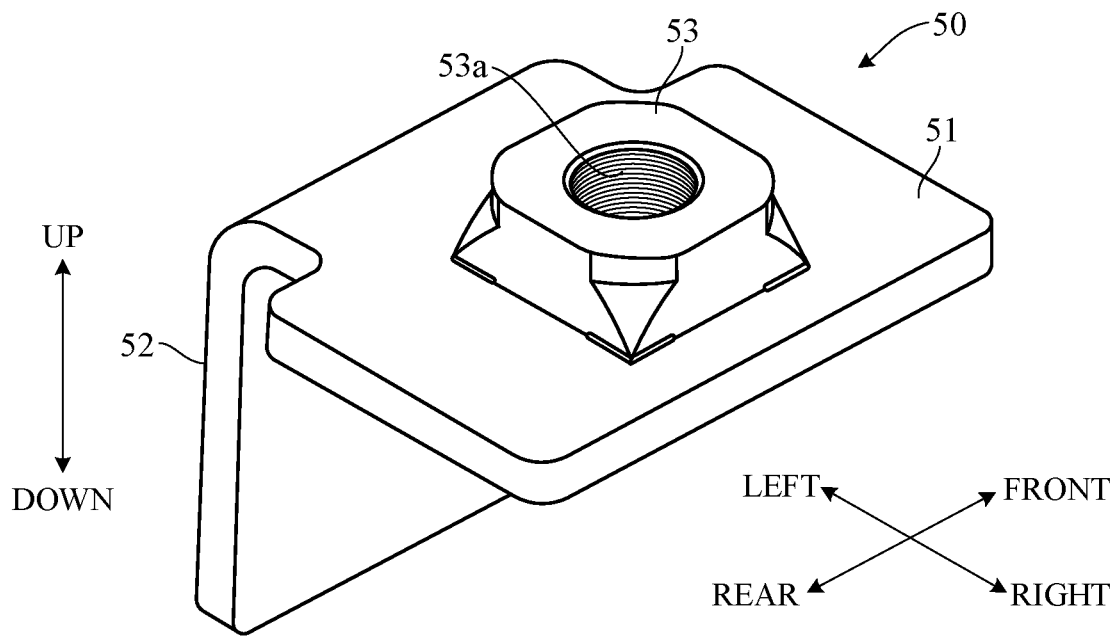
FIG. 5A is a perspective view showing an overall configuration of a fastening bracket of FIG. 1.
Figure 5B:
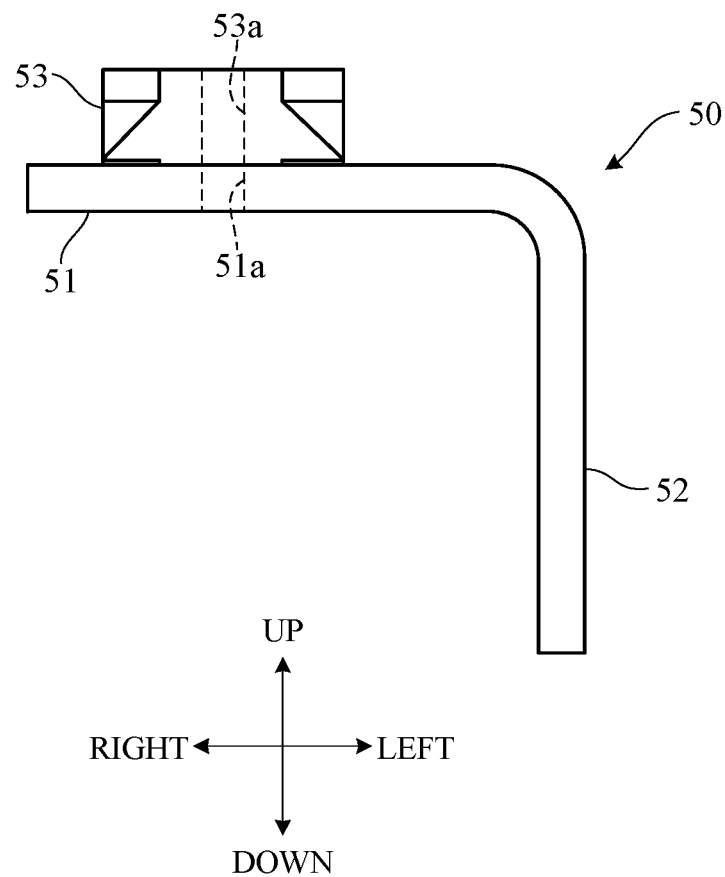
FIG. 5B is a side view showing the overall configuration of the fastening bracket of FIG. 1.
Figure 6:
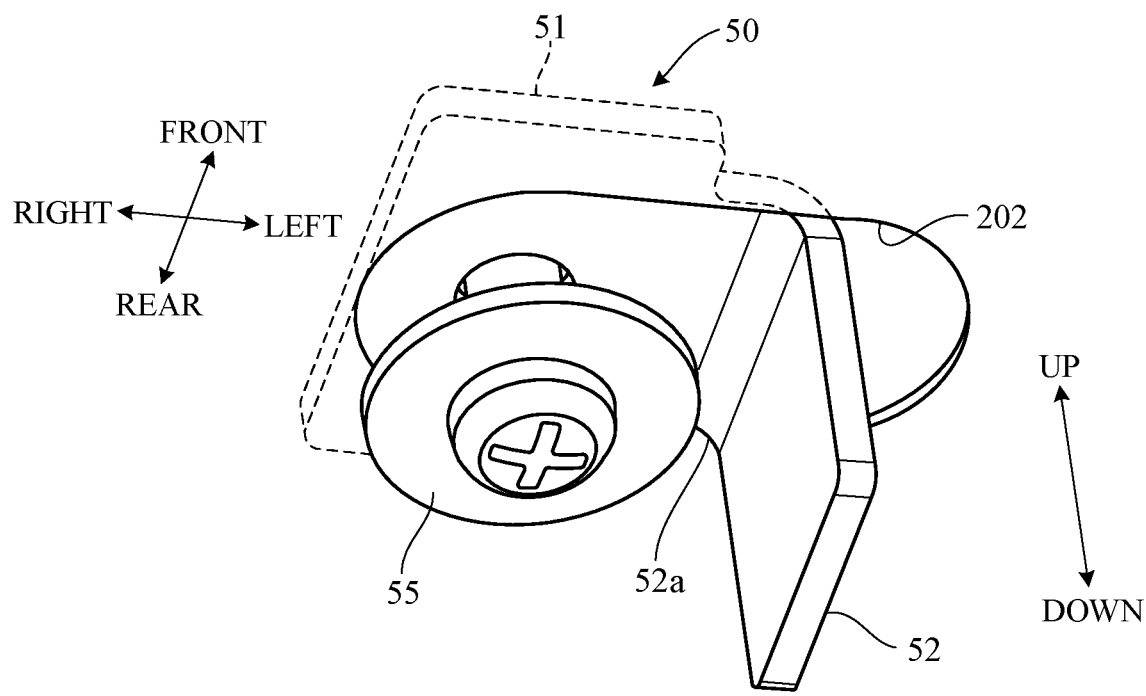
FIG. 6 is a perspective view showing a state in which the fastening bracket of FIG. 5A is mounted.

FIG. 5A is a perspective view showing an overall configuration of the fastening bracket 50, and FIG. 5B is a side view. FIG. 6 is a perspective view (viewed from below and diagonally) showing an attachment state of the fastening bracket 50 to the rear frame 2B. In FIGS. 5A and 5B, the front-back direction, left-right direction, and up-down direction of the fastening bracket 50 corresponding to FIG. 6 are indicated. As shown in FIGS. 5A and 5B, the fastening bracket 50 is formed by bending a flat plate into a substantially L-shaped form, and has a horizontal plate portion 51 having a substantially rectangular shape in a plan view extending substantially horizontally, and a vertical plate portion 52 having a substantially rectangular shape in a side view extending downward from an end portion (left end portion in the drawing) of the horizontal plate portion 51. A nut 53 is joined to a central portion of an upper surface of the horizontal plate portion 51. A through hole 51a having a larger diameter than the screw hole 53a of the nut 53 is opened on the horizontal plate portion 51 and is coaxial with the screw hole 53a of the nut 53.

As shown in FIG. 6, the length of the horizontal plate portion 51 in the front-rear direction is longer than the length in the front-rear direction of the slot hole 202 of the rear frame 2B, and the horizontal plate portion 51 is disposed above the slot hole 202 so as to intersect with the slot hole 202. The length in the front-rear direction of the vertical plate portion 52, in particular, the front-rear length at the upper end of the vertical plate portion 52, is equal to or slightly shorter than the front-rear length of the slot hole 202. Therefore, when the bolt 55 is screwed into the screw hole 53a of the nut 53 through the through hole 51a (FIG. 5B) from below the horizontal plate portion 51, the side surface 52a of the vertical plate portion 52 comes into contact with the edge of the slot hole 202, thereby preventing a rotation of the fastening bracket 50 about the screw hole 53a.

The length in the front-rear direction of the horizontal plate portion 51 is shorter than the length in the left-right direction of the slot hole 202. Therefore, by rotating the horizontal plate portion 51 around the screw hole 53a as the center in one direction by 90 degrees from the state shown in FIG. 6, and further inclining the horizontal plate portion 51 in the up-down direction, the horizontal plate portion 51 can be guided from below the rear frame 2B to above the rear frame 2B, passing through the slot hole 202. Then, the inclination of the horizontal plate portion 51 in the up-down direction is returned to its original state, and further by rotating the horizontal plate portion 51 in the opposite direction by 90 degrees around the screw hole 53a as the center, the state shown in FIG. 6 is achieved.

Figure 7A:
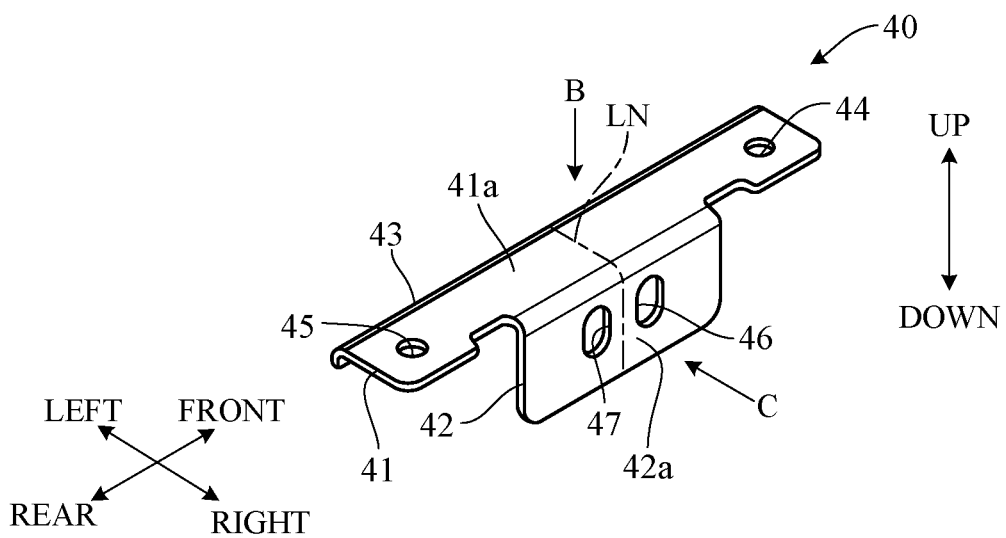
FIG. 7A is a perspective view showing an overall configuration of a sub-bracket of FIG. 1.
Figure 7B:
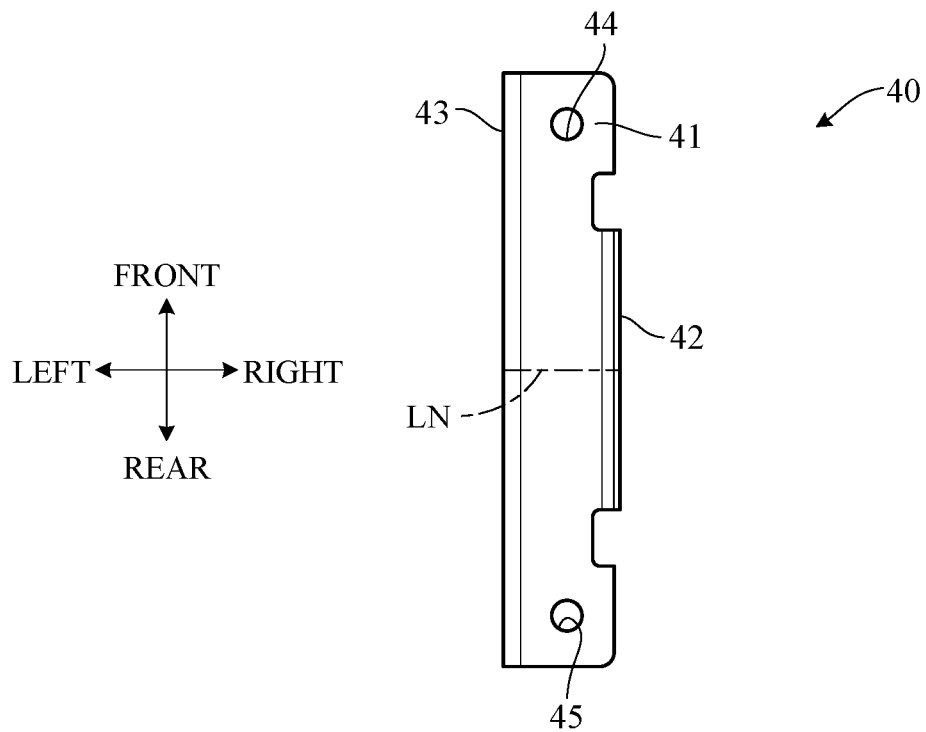
FIG. 7B is a view taken in a direction of an arrow B of FIG. 7A.
Figure 7C:
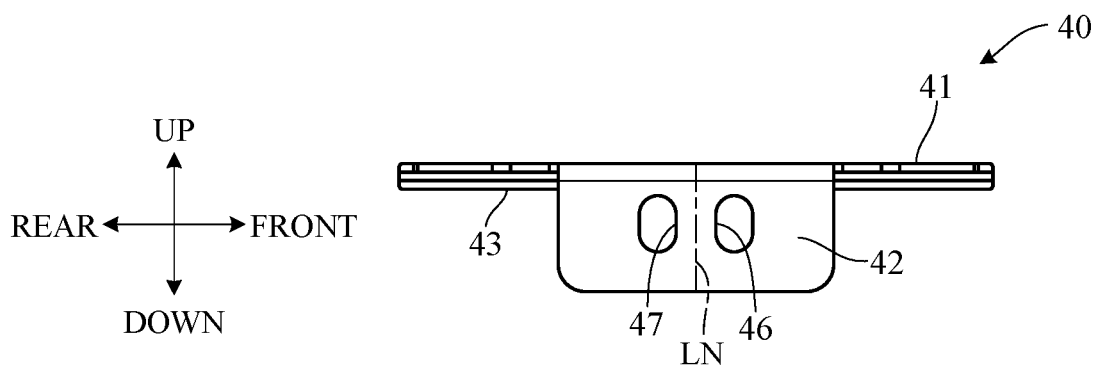
FIG. 7C is a view taken in a direction of an arrow C of FIG. 7A.

FIG. 7A is a perspective view showing the overall configuration of the sub-bracket 40, particularly the right sub-bracket 40, FIG. 7B is a plan view (a view taken in a direction of arrow B in FIG. 7A) and FIG. 7C is a side view (a view taken in a direction of arrow C in FIG. 7A). The left and right sub-brackets 40 have the same shape, and if the sub-bracket 40 in FIG. 7A is rotated 180 degrees around a hypothetical vertical axis, it becomes the left sub-bracket 40.

As shown in FIGS. 7A to 7C, the sub-bracket 40 is composed of a metal plate member and has a symmetrical shape with respect to a reference line LN along the vertical plane at the intermediate position in the front-back direction. Specifically, the sub-bracket 40 is formed by bending a plate member of a predetermined shape at an approximately right angle and includes a horizontal plate portion 41 extending in a substantially horizontal direction and a vertical plate portion 42 extending downward from the right end portion of the horizontal plate portion 41. The horizontal plate portion 41 has an approximately rectangular shape in plan view, and the vertical plate portion 42 has an approximately rectangular shape in side view. The horizontal plate portion 41 is formed to protrude in the front-rear direction from the vertical plate portion 42. A bent portion 43 bent downward is provided at the left end portion of the horizontal plate portion 41.

In both ends in the front-rear direction of the horizontal plate portion 41, substantially circular through holes 44 and 45 are drilled so as to penetrate the horizontal plate portion 41 in the up-down direction. In the vertical plate portion 42, elongated holes 46 and 47 that penetrate the vertical plate portion 42 in the left-right direction and have a long dimension in the up-down direction are drilled behind the through hole 44 and in front of the through hole 45. As shown in FIG. 7A, the upper surface of the horizontal plate portion 41 forms a substantially flat horizontal surface 41a. The outer end surface (right end surface in FIG. 7A) of the vertical plate portion 42 forms a substantially flat vertical surface 42a.

Figure 8:
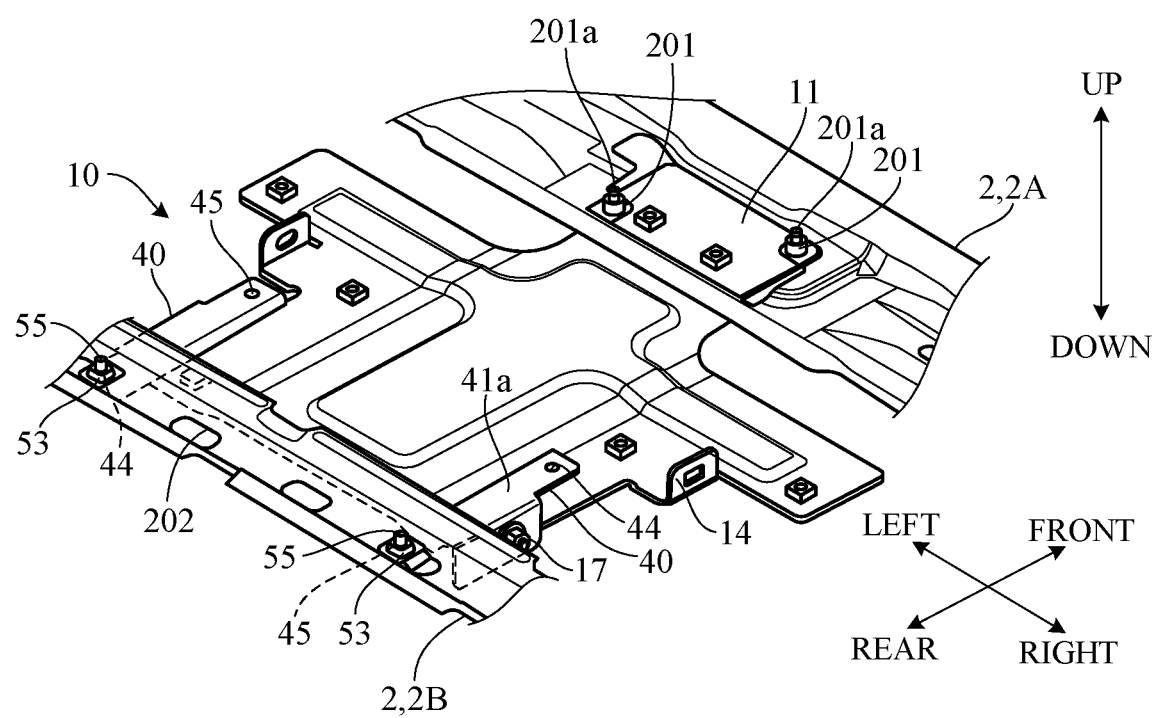
FIG. 8 is a perspective view showing the configuration of an attachment portion of a main bracket included in the vehicle monitor apparatus according to the embodiment of the present invention.
Figure 9:
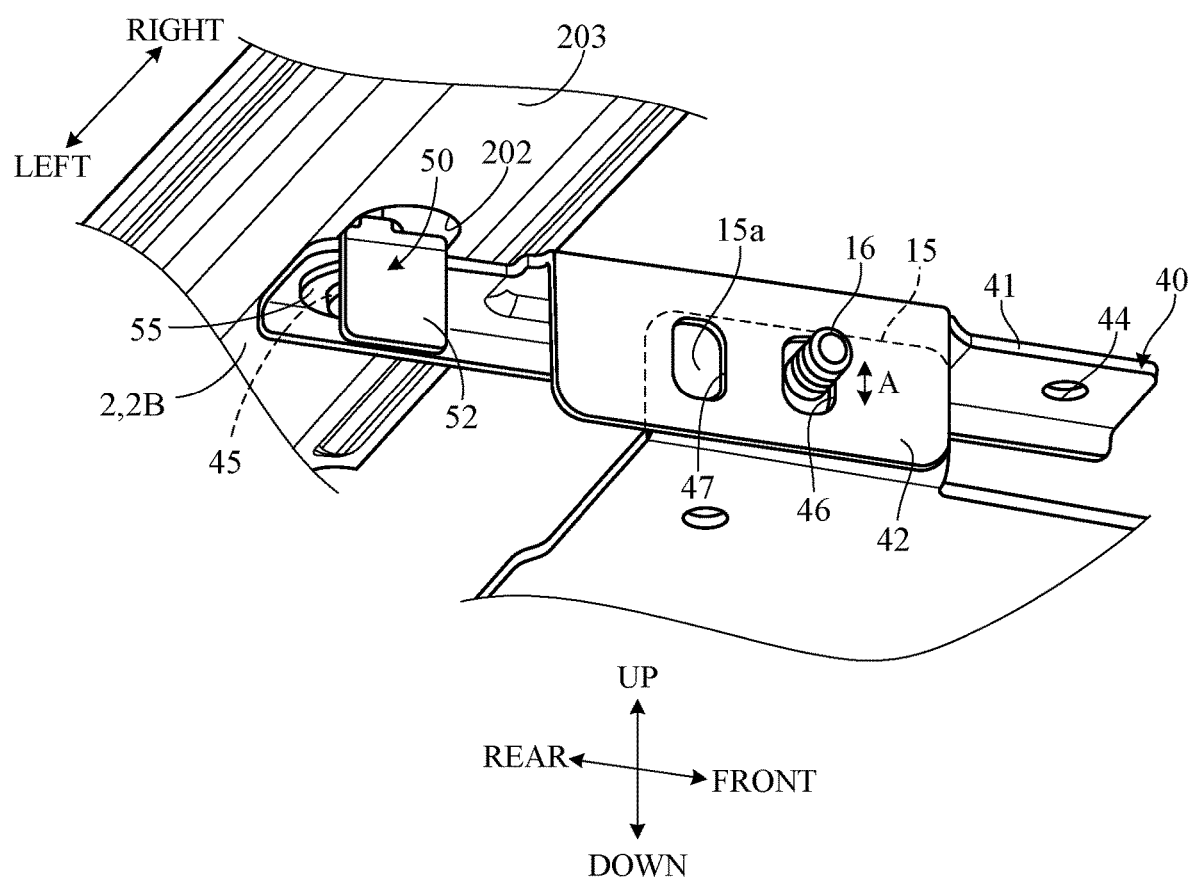
FIG. 9 is a perspective view showing the configuration of an attachment portion of a sub-bracket included in the vehicle monitor apparatus according to the embodiment of the present invention.

FIG. 8 is a perspective view (obliquely seen from above) showing the configuration of the attachment portion of the main bracket 10 that is attached to the front and rear frames 2. FIG. 9 is a perspective view (obliquely seen from below) showing the configuration of the attachment portion of the right sub-bracket 40 shown in FIG. 8. As shown in FIG. 9, a bolt 55 (FIG. 6) is inserted from below into the rear through hole 45 of the horizontal plate portion 41 of the sub-bracket 40. Specifically, the bolt 55 is inserted while the horizontal surface 41a (FIG. 8) of the horizontal plate portion 41 is in contact with the bottom surface 203 of the rear frame 2B. As shown in FIG. 8, the bolt 55 is screwed into a nut 53 of the fastening bracket 50, thereby fixing the right sub-bracket 40 to the rear frame 2B. At this time, no bolt is inserted into the front through hole 44. The left sub-bracket 40 is used by rotating the right sub-bracket 40 by 180 degrees. Therefore, a bolt 55 is inserted into the rear through hole 44 of the left sub-bracket 40, and no bolt is inserted into the front through hole 45.

As shown in FIG. 9, a bolt 16 is projected toward the right from a bent portion 15 that rises upward from the right end of the rear end portion of the main bracket 10. The bolt 16 is provided integrally with the bent portion 15 by welding or the like. The bolt 16 passes through the front elongated hole 46 of the sub-bracket 40, and a nut 17 is screwed onto the bolt 16 from the right side, as shown in FIG. 8. As a result, the rear end portion of the main bracket 10 is supported on the rear frame 2B via the sub-bracket 40. At this time, as shown in FIG. 9, no bolt is inserted into the elongated hole 47. Since the main bracket 10 is fixed by the bolt 16 inserted through the elongated hole 46, the position adjustment of the main bracket 10 in the up-down direction (direction of arrow A) with respect to the sub-bracket 40 is possible.

Although not shown, a bolt 16 is projected toward the left from the bent portion 15 (FIG. 1) that rises upward from the left end of the rear end portion of the main bracket 10. After passing through the elongated hole 47 of the left sub-bracket 40, the end of the bolt is screwed with a nut 17. As a result, both left and right ends of the main bracket 10 are supported on the rear frame 2B via the sub-brackets 40. In the state where the main bracket 10 is fixed to the sub-brackets 40, as shown in FIG. 9, the rear end of the main bracket 10 is positioned forward of the rear frame 2B. Therefore, the main bracket 10 can be configured to be short in the front-rear direction.

Figure 10A:
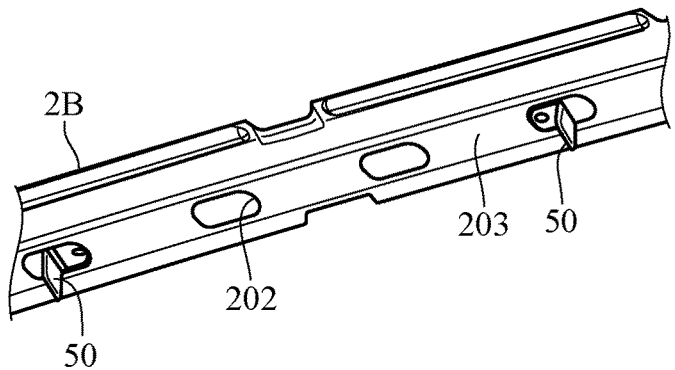
FIG. 10A is a drawing showing a first step for mounting the vehicle monitor apparatus according to the embodiment of the present invention.
Figure 10B:
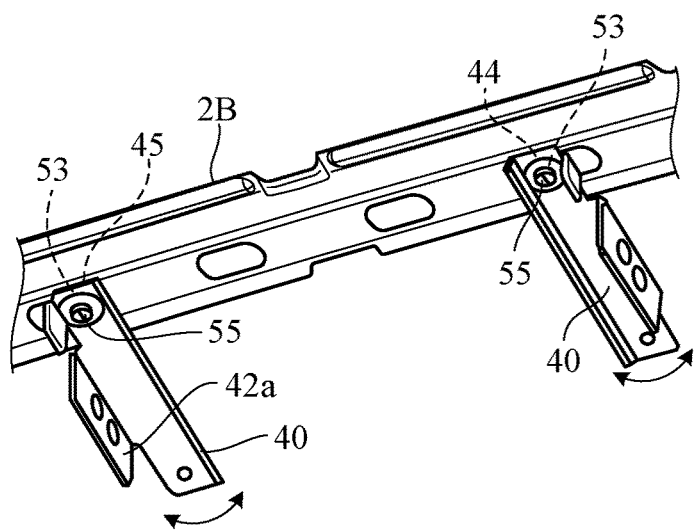
FIG. 10B is a drawing showing a second step following the first step of FIG. 10A.

FIGS. 10A to 10G illustrate an example of the installation procedure for a vehicle monitor apparatus 100. To install the vehicle monitor apparatus 100, first, as shown in FIG. 10A, a pair of fastening brackets 50 are inserted from below into the slot holes 202 of the rear frame 2B. Specifically, after the horizontal plate portions 51 are inserted, the fastening brackets 50 are rotated by 90 degrees to prevent them from falling. Next, as shown in FIG. 10B, bolts 55 are inserted from below into the through holes 44 and 45 of the sub-brackets 40, and then are screwed into nuts 53 of the fastening brackets 50. Therefore, the pair of sub-brackets 40 are attaches to the rear frame 2B. At this point, the bolts 55 are kept loose, so that the sub-brackets 40 can rotate in the arrow direction (left and right direction) around the bolts 55.

Figure 10C:
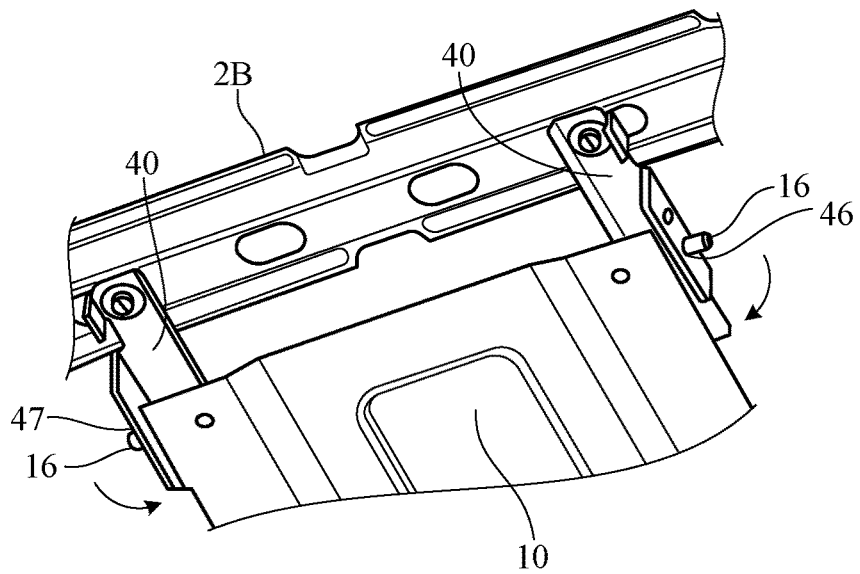
FIG. 10C is a drawing showing a third step following the second step of FIG. 10B.

Next, the sub-brackets 40 are rotated (move away) to the outer left and right directions, and then the main bracket 10 is disposed between the left and right sub-brackets 40, as shown in FIG. 10C. Furthermore, the left and right sub-brackets 40 are rotated inwards (arrow direction in FIG.

10C), and a pair of bolts 16 projected outward in the left-right direction from the bent portions 15 at the left and right ends of the main bracket 10 are inserted into the elongated holes 46 and 47 of the sub-brackets 40. Therefore, the main bracket 10 is temporarily supported by the sub-brackets 40. At this time, the end surfaces 15a (FIG. 9) on the outer side in the left-right direction of the bent portions 15 and the vertical surfaces 42a (FIG. 10B) on the inner side in the left-right direction of the vertical plate portion 42 of the sub-bracket 40 are parallel to each other so that the end surfaces 15a and the vertical surfaces 42a bring into contact without any gap.

Figure 10D:
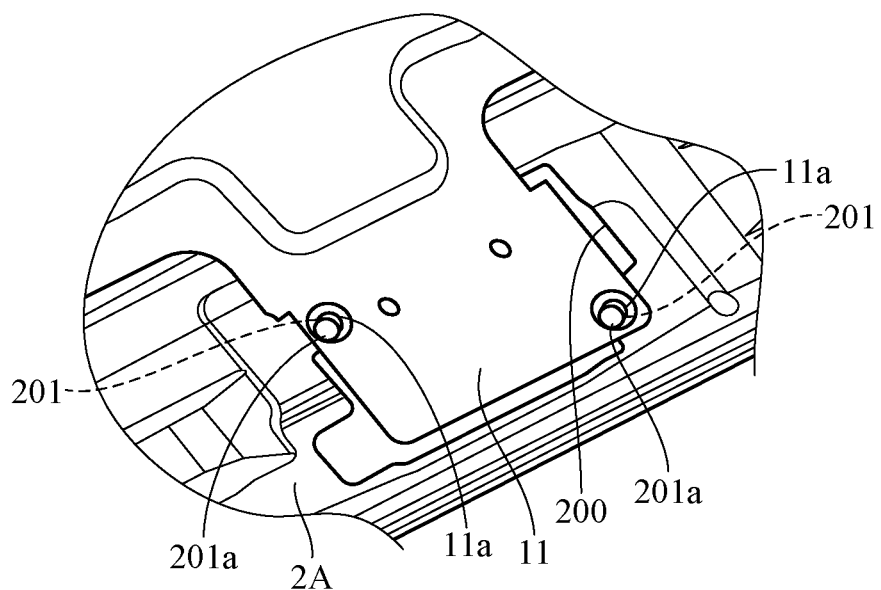
FIG. 10D is a drawing showing a fourth step following the third step of FIG. 10C.
Figure 10E:
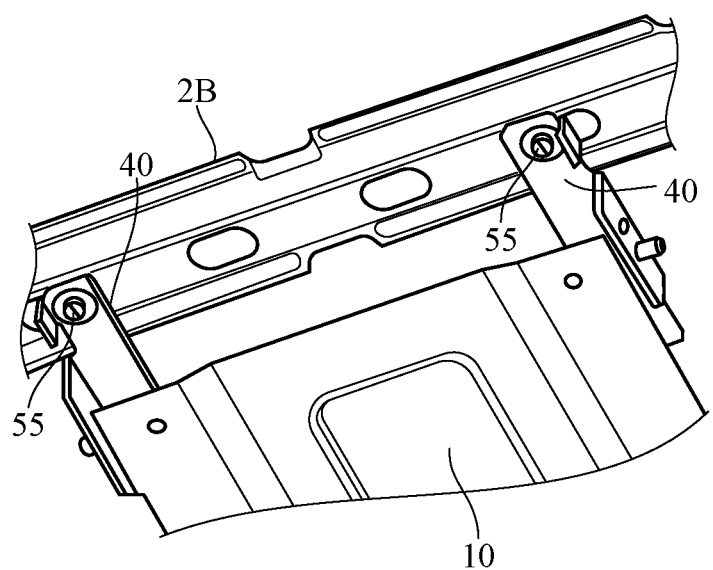
FIG. 10E is a drawing showing a fifth step following the fourth step of FIG. 10D.

Next, as shown in FIG. 10D, bolts 201a are inserted from below into the through holes 11a of the stay 11 at the front end portion of the main bracket 10, and are screwed into the screw holes 201 provided around the opening 200 of the front frame 2A. Therefore, the front end portion of the main bracket 10 is fixed to the front frame 2A. Then, as shown in FIG. 10E, a fastening force is applied to each of the bolts 55 inserted into the rear end portions of the sub-brackets 40 to secure the sub-brackets 40 to the rear frame 2B.

Figure 10F:
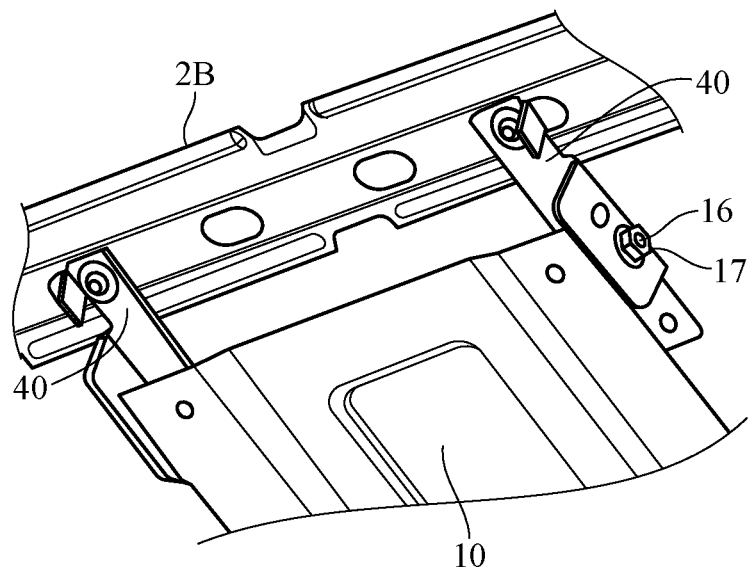
FIG. 10F is a drawing showing a sixth step following the fifth step of FIG. 10E.
Figure 10G:
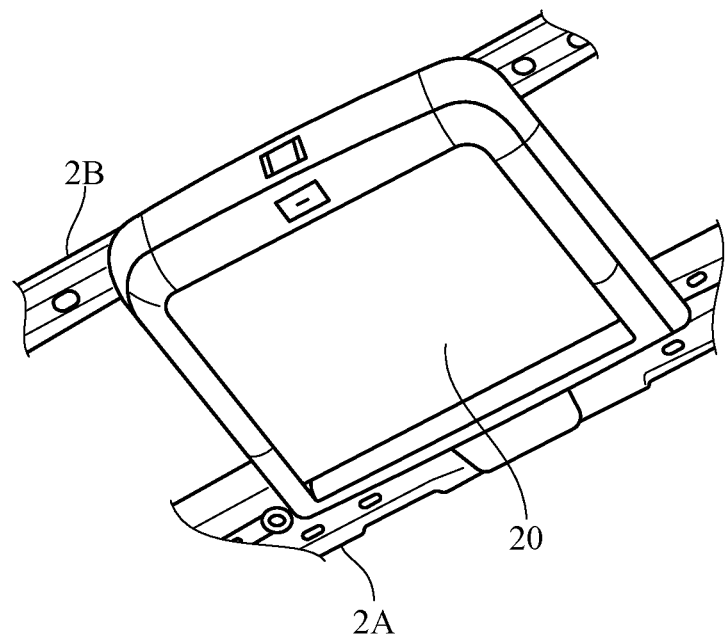
FIG. 10G is a drawing showing a seventh step following the sixth step of FIG. 10F.

Next, as shown in FIG. 10F, nuts 17 are screwed onto the bolts 16 inserted into the elongated holes 46 and 47 (FIG. 10C) of the sub-bracket 40 so as to fix the left and right ends of the rear end portion of the main bracket 10 to the sub-brackets 40. At this time, the height (tilt) of the main bracket 10 adjusted while fixing the main bracket 10 to the sub-bracket 40 by shifting the positions of the bolts 16 along the elongated holes 46 and 47 so that the bottom surface of the main bracket 10 becomes horizontal. Then, a cover 31 (FIG. 1) is attached to cover the stay 11 from below the main bracket 10. Furthermore, the bolts inserted into the through holes 24 (FIG. 3) of the base 21 of the monitor body 20 are screwed into the screw holes 13 of the main bracket 10, and as shown in FIG. 10G, the monitor body 20 is fixed to the main bracket 10. With this, the installation of the vehicle monitor apparatus 100 is completed.

In this embodiment, as described above, the elongated holes 46 and 47 elongated in the up-down direction are provided in the vertical plate portion 42 of the sub-bracket 40. Therefore, the bolts 16 projected from the main bracket 10 in the left-right directions can move along the elongated holes 46 and 47. This enables the height adjustment of the main bracket 10 with respect to the rear frame 2B. As a result, even if there is variation in the height (for example, at different positions in the left-right direction) of the rear frame 2B, it is possible to prevent excessive stress from being generated in the frame 2 or the main bracket 10 when installing the main bracket 10 using bolts.

In addition, in the process of mounting the vehicle monitor apparatus 100, the pair of left and right sub-brackets 40 are provided to be rotatable in the left-right direction (FIG. 10B), so that the main bracket 10 can be mounted with high precision in the left-right direction. Furthermore, since the sub-bracket 40 is configured symmetrically in the front-rear direction with respect to the reference line LN (FIG. 7A), the same shaped sub-brackets 40 can be used on both left and right sides, saving the number of parts (types of parts). The sub-bracket 40 is formed to be elongated in the front-rear direction, and the through holes 44 and 45 for fixing the sub-bracket 40 to the rear frame 2B and the elongated holes 46 and 47 for fixing the main bracket 10 to the sub-bracket 40 are provided to be spaced apart from each other in the front-rear direction. As a result, the main bracket 10 can be disposed in front of the rear frame 2B, and the main bracket 10 can be downsized in the front-rear directions.

According to the present embodiment, following functions and effects can be exerted.

(1) The vehicle monitor apparatus 100 includes a main bracket 10 supported by a pair of front and rear frames 2 (front frame 2A, rear frame 2B) extended in the left-right direction in the ceiling portion 1 of the vehicle, a monitor body 20 attached to the main bracket 10, and a sub-bracket 40 interposed between the rear frame 2B and the main bracket 10 (FIG. 1). The sub-bracket 40 includes a horizontal plate portion 41 fixed to the rear frame 2B, i.e., a horizontal plate portion 41 in which the through holes 44 and 45 are opened, and a vertical plate portion 42 fixed to the main bracket 10, i.e., a vertical plate portion 42 in which the elongated holes 46 and 47 are opened (FIGS. 7A to 7C). The elongated holes 46 and 47 function as a height adjustment mechanism capable of adjusting the height of the main bracket 10 relative to the rear frame 2B.

With this configuration, if there is variation in the height of the rear frame 2B, the variation in height can be absorbed by the elongated holes 46 and 47. Therefore, the main bracket 10 can be mounted in a good posture, and the mounting work of the main bracket 10 can be easily performed. In addition, when mounting the main bracket 10, it is possible to support the main bracket 10 from the frame 2 in the desired horizontal posture without generating excessive stress on the frame 2 or the main bracket 10. As a result, the monitor body 20 can be optimally attached to the main bracket 10.

(2) The vertical plate portion 42 of the sub-bracket 40 includes a vertical surface 42a abutted against the end surface 15a on the outer side in the left-right direction of the main bracket 10 and extending in the vertical direction (FIGS. 9 and 10B). The height adjustment mechanism is configured by elongated holes 46 and 47 extending in the up-down direction on the vertical surface 42a so that the bolts 16 projected from the end surfaces 15a on the outer side in the left-right direction of the main bracket 10 are inserted (FIG. 9). Thus, the height of the main bracket 10 can be adjusted with a simple configuration.

(3) The horizontal plate portion 41 of the sub-bracket 40 includes a horizontal surface 41a abutted against the bottom surface 203 of the rear frame 2B and extending in the horizontal direction (FIGS. 8 and 9). In the horizontal surface 41a, through holes 44 and 45 are provided so that bolts 55 passing through the bottom surface 203 of the rear frame 2B are inserted (FIG. 8). As a result, the sub-bracket 40 can be easily and securely fixed to the rear frame 2B.

(4) The sub-bracket 40 includes a pair of left and right sub-brackets that are fixed to both ends in the left-right direction of the main bracket 10. This enables stable support of both ends in the left-right direction of the main bracket 10 from the rear frame 2B via the sub-bracket 40.

(5) The pair of left and right sub-brackets 40 are symmetrically configured with respect to a reference line LN in the intermediate portion in the front-rear direction (FIG. 7A to 7C). The elongated holes 46 and 47 are symmetrically arranged with respect to the reference line LN, and the through holes 44 and 45 are also symmetrically arranged with respect to the reference line LN (FIG. 7A to 7C). Therefore, by rotating the sub-bracket 40 having an asymmetric shape in the left-right direction by 180°, the sub-brackets 40 having the same configuration can be used on both left and right sides of the main bracket 10. As a result, the number of parts can be reduced and costs can be reduced.

The above embodiment may be modified into various forms. Hereinafter, some modifications will be described. In the above embodiment, the sub-brackets 40 with height adjustment mechanisms are fixed to the rear frame 2B of the pair of front and rear frames 2A and 2B. However, it is also possible to fix the sub-brackets with height adjustment mechanisms to the front frame 2A. In other words, a target frame to which the sub-brackets are fixed may be either the front frame or the rear frame, or both the front and rear frames.

In the above embodiment, through holes 44 and 45 are provided in the horizontal plate portion 41 of the sub-bracket 40 as a first fixing portion which is fixed to the rear frame 2B, and elongated holes 46 and 47 are provided in the vertical plate portion 42 of the sub-bracket 40 as a second fixing portion which is fixed to the main bracket 10. However, the configurations of the first fixing portion and the second fixing portion are not limited to the above embodiment. In the above embodiment, elongated holes 46 and 47 are provided in the vertical plate portion 42 (the second fixing portion) of the sub-bracket 40 as the height adjustment mechanism. However, the configuration of the height adjustment mechanism is not limited to this. The height adjustment mechanism may be provided in the first fixing portion. The height adjustment mechanism may be also provided in both the first fixing portion and the second fixing portion.

In the above embodiment, the sub-brackets 40 provided on both sides in the left-right direction of the main bracket 10 are made identical in shape. Specifically, the sub-brackets are provided with the through hole 44 (a first through hole) and the through hole 45 (a second through hole), which are symmetrically positioned with respect to the reference line LN of the horizontal plate portion 41, and the elongated hole 46 (a first elongated hole) and the elongated hole 47 (a second elongated hole), which are symmetrically positioned with respect to the reference line LN of the vertical plate portion 42. However, it is also possible to provide a single through hole and a single elongated hole and to make the shapes of the left and right sub-brackets different from each other.

The above embodiment can be combined as desired with one or more of the above modifications. The modifications can also be combined with one another.

According to the present invention, it is possible to easily perform a mounting work of a main bracket.

Above, while the present invention has been described with reference to the preferred embodiments thereof, it will be understood, by those skilled in the art, that various changes and modifications may be made thereto without departing from the scope of the appended claims.

What is claimed is:

1. A vehicle monitor apparatus, comprising:
a main bracket supported by a pair of front and rear frames extending in a left-right direction on a ceiling portion of a vehicle;
a monitor attached to the main bracket; and
a sub-bracket interposed between the main bracket and a target frame, the target frame being at least one of the pair of front and rear frames, wherein
the sub-bracket includes a first fixing portion fixed to a fastening portion formed at the target frame with a first bolt extending in an up-down direction and a second fixing portion fixed to the main bracket,
the second fixing portion includes a vertical surface extending in the up-down direction so as to abut against an end surface of the main bracket in the left-right direction, and an elongated hole formed on the vertical surface in the up-down direction so that a second bolt protruding in the left-right direction from the end surface of the main bracket passes through the elongated hole.

2. The vehicle monitor apparatus according to claim 1, wherein
the first fixing portion includes a horizontal surface extended in a horizontal direction so as to abut against a bottom surface of the target frame, and
a through hole is provided on the horizontal surface so that a bolt passing through the bottom surface of the target frame passes through the through hole.

3. The vehicle monitor apparatus according to claim 2, wherein
the sub-bracket includes a pair of left and right sub-brackets fixed to both end portions in the left-right direction of the main bracket.

4. The vehicle monitor apparatus according to claim 3, wherein
the main bracket includes a pair of left and right bent portions bent upward at both end portions in the left-right direction,
the pair of left and right sub-brackets are a left sub-bracket and a right sub-bracket,
the second fixing portion of the left sub-bracket is configured by bending downward from a left end portion of the first fixing portion,
the second fixing portion of the right sub-bracket is configured by bending downward from a right end portion of the first fixing portion, and
the main bracket is fixed to the pair of left and right sub-brackets in a state where outer side surfaces in the left-right direction of the pair of left and right bent portions abut against a right side surface of the second fixing portion of the left sub-bracket and a left side surface of the second fixing portion of the right sub-bracket, respectively.

5. The vehicle monitor apparatus according to claim 3, wherein
the pair of left and right sub-brackets are configured symmetrically with respect to a reference line defined in an intermediate portion in a front-rear direction,
the elongated hole includes a first elongated hole and a second elongated hole arranged at symmetrical positions with respect to the reference line, and
the through hole includes a first through hole and a second through hole arranged at symmetrical positions with respect to the reference line.

6. The vehicle monitor apparatus according to claim 1, wherein
the target frame is a rear frame among the pair of front and rear frames, and
a rear end portion of the main bracket is positioned forward of the rear frame.

7. The vehicle monitor apparatus according to claim 6, wherein
a through hole is provided at a front end portion of the main bracket so that a bolt passing through a front frame among the pair of front and rear frames passes through the through hole.

8. The vehicle monitor apparatus according to claim 1, wherein the first fixing portion is positioned on a side of the target frame relative to the second fixing portion.

* * * * *